J. F. O'CONNOR.
ROLLER SIDE BEARING.
APPLICATION FILED JULY 1, 1918.
1,290,328.
Patented Jan. 7, 1919.
2 SHEETS—SHEET 1.
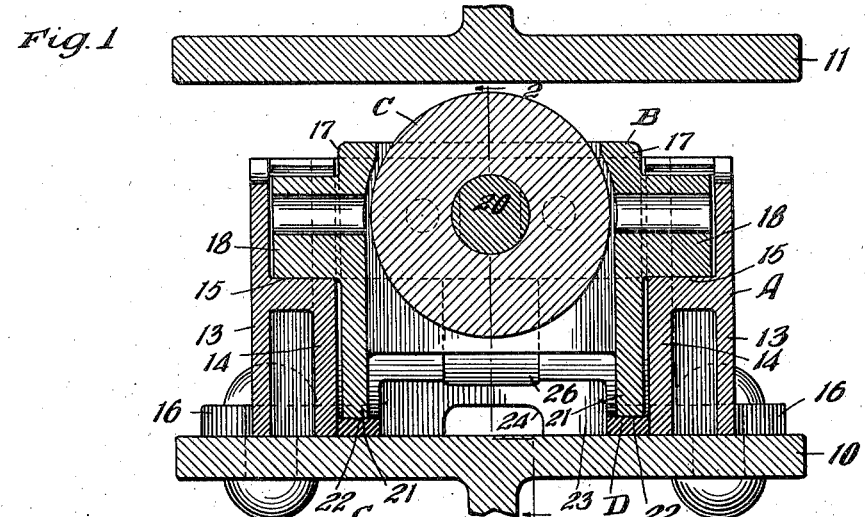
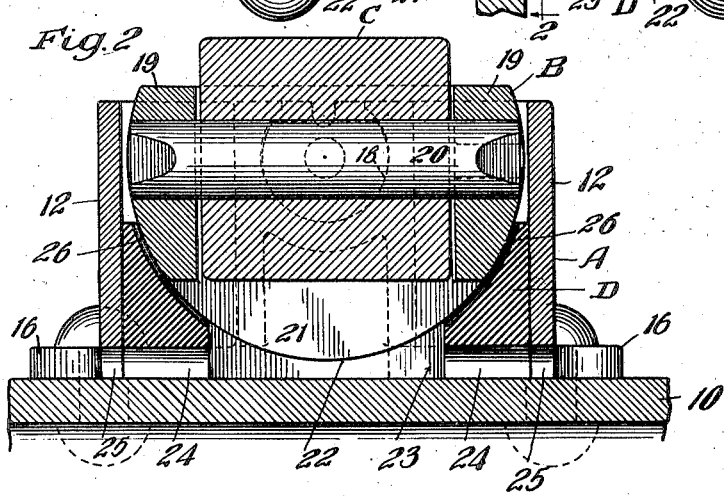
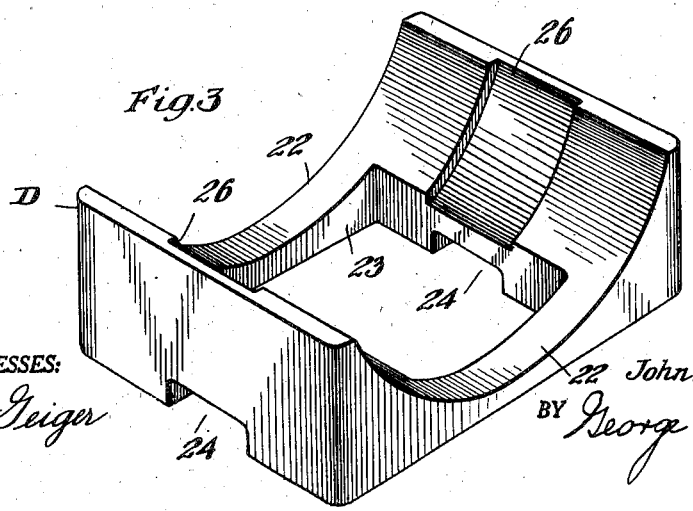
WITNESSES:
Wm. Geiger
INVENTOR.
John F. O'Connor
BY George O. Haight
ATTORNEY

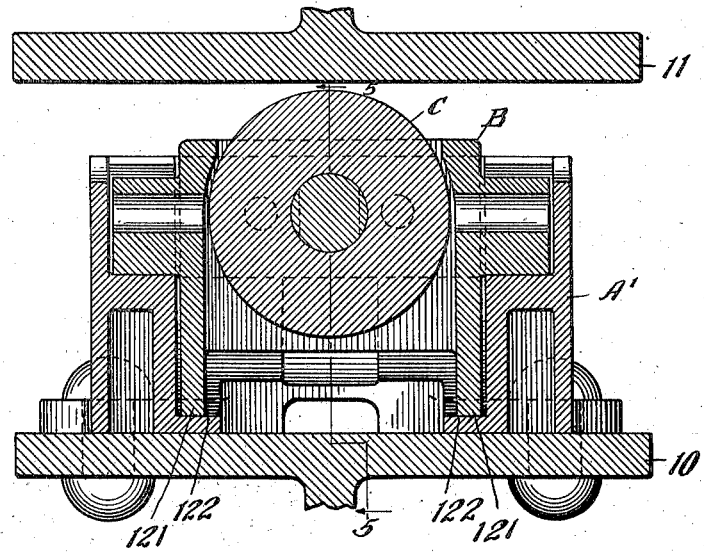
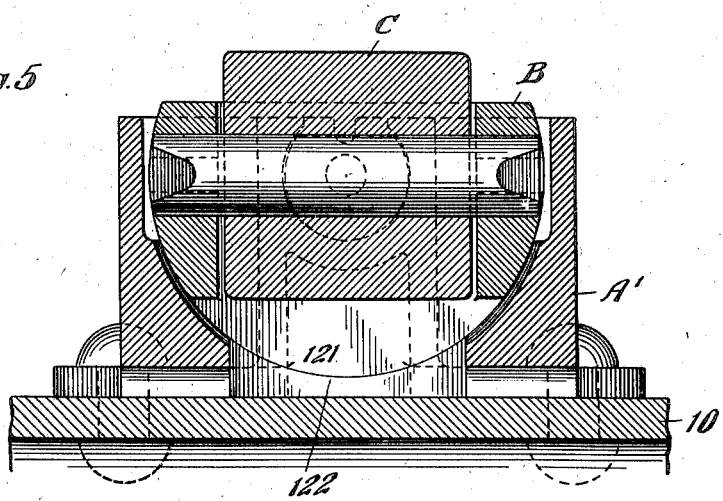

UNITED STATES PATENT OFFICE.

JOHN F. O'CONNOR, OF CHICAGO, ILLINOIS, ASSIGNOR TO WILLIAM H. MINER, OF CHAZY, NEW YORK.

ROLLER SIDE BEARING.

1,290,328.　　　　Specification of Letters Patent.　　Patented Jan. 7, 1919.

Application filed July 1, 1918. Serial No. 242,822.

*To all whom it may concern:*

Be it known that I, JOHN F. O'CONNOR, a citizen of the United States, residing at Chicago, in the county of Cook and State of Illinois, have invented a certain new and useful Improvement in Roller Side Bearings, of which the following is a full, clear, concise, and exact description, reference being had to the accompanying drawings, forming a part of this specification.

This invention relates to improvements in roller side bearings.

In railway operation, it has been common to employ a side bearing for cars wherein is employed a roller carrying cradle rockably mounted about trunnions supported in a base casting, the cradle being oscillatable so as to automatically adjust itself to varying conditions of service. In some classes of service, as for instance in the transportation of coal and ore where the capacity of the cars now approximates 70 to 100 tons, the load applied on the side bearings under certain conditions is extremely severe, oftentimes amounting to scores of tons. The result has been that the enormous pressure applied to the anti-friction rollers has caused the cradles to bend as a bridge bends under severe load applied at the center thereof, the cradle thereby collapsing between the trunnions to such an extent that the end walls are brought together and ultimately clamp the anti-friction roller therebetween so that the roller cannot perform its proper function.

One object of my invention is to provide a roller side bearing of the general type above indicated, that is, one employing a cradle mounted on trunnions, so arranged that the trunnions are relieved of a greater part of the severe loads heretofore encountered.

Another and more specific object of the invention is to provide a roller side bearing of the general type above indicated wherein the old base castings or retaining members may be reëmployed without modification, thereby effecting a large saving to the railroads that are required to change their side bearings to withstand the present increased loads.

In the drawing forming a part of this specification, Figure 1 is a vertical, sectional view of a side bearing showing my improvements in connection therewith, the section extending lengthwise of the car, that is, transversely of the bolsters. Fig. 2 is a vertical, sectional view, taken substantially on the line 2—2 of Fig. 1. Fig. 3 is a detail, perspective of the bearing block insert shown in Figs. 1 and 2. Figs. 1, 2 and 3 show my invention embodied in a side bearing wherein an old or well known form of base casting or retaining member is reëmployed without modification. Figs. 4 and 5 are views similar to Figs. 1 and 2 but illustrating my invention embodied in a side bearing wherein the base casting or retaining member is modified as compared with the present type commonly employed.

Referring first to the construction illustrated in Figs. 1 to 3, 10 denotes the upper wall of a truck bolster and 11 the under side of a body bolster. The improved side bearing is shown applied to the truck bolster with the anti-friction roller adapted to engage the body bolster.

As shown, the improved side bearing comprises, broadly, a base or retaining casting A, a cradle B, an anti-friction roller C, and an auxiliary bearing block insert D.

The base casting A is of substantially rectangular formation having vertical spaced side walls 12—12, end walls 13—13, the latter being formed on their interior with enlargements 14—14 having journal or trunnion bearings 15—15 at their tops, and flanges or ears 16 by which the casting is adapted to be riveted to the truck bolster.

The cradle B is of substantially rectangular hollow box-like form having end walls 17—17 provided with integral trunnions 18—18, and side walls 19—19.

The anti-friction roller C is of cylindrical form and rotatably mounted on a journal or axle 20, the ends of which are seated in the side walls 19—19 of the cradle and prevented from rotation with respect thereto in any suitable manner.

In order to relieve the cradle of the severe bending strains heretofore encountered, the end walls 17—17 of the cradle are extended downwardly so as to provide circular flanges 21—21 at the ends of the cradle and between the enlargements 14—14 of the base casting. Coöperable with the circular flanges 21 of the cradle are corresponding curved bearing surfaces 22—22 formed on the upper face of the insert D. The insert D is of substantially rectangular formation and is inserted in the base casting A as clearly illustrated in the drawing. To save metal, the cradle D is cut away at its center, as indicated at 23, and is preferably recessed on its under side, as indicated at 24—24, in alinement with the openings 25—25 of the base casting so as to permit dirt and other foreign matter to be readily washed out. In addition, the insert D is grooved at opposite sides thereof as indicated at 26—26 in order to provide sufficient clearance for any projecting portions of the journal 20.

With the construction above described, it is evident that pressure transmitted to the anti-friction roller is in turn transmitted to the vertical end walls 17—17 of the cradle, thus placing said end walls 17 under compression. The pressure is in turn transmitted from the end walls 17 to the insert D and the latter placed under compression. As will be understood, the curved bearing surfaces on the end walls 17 of the cradle and on the insert D are made concentric with the trunnions 18. With the construction shown, the trunnions may take part of the load and the auxiliary bearing surfaces a part also and I thereby obtain a side bearing having the advantages of a rocking cradle but without danger of the end walls 17—17 of the cradle being forced inwardly toward each other with resultant clamping of the anti-friction roller. I am also enabled to reëmploy the well known base casting shown in the drawing with consequent saving to the railroads.

In the construction shown in Figs. 4 and 5, the arrangement of cradle and anti-friction roller is the same as in the other figures. In this construction, however, the base casting A' is of special formation and has the auxiliary curved bearing surfaces 122—122 thereof formed integrally with the base casting so as to coöperate with the curved bearing surfaces 121 of the cradle. In all other respects, the two side bearings are identical and the improved form of cradle may be employed in either construction.

I claim:

1. In a side bearing, the combination with a base member having trunnion bearings, of a cradle having trunnions mounted in said bearings and thereby adapting the cradle for rocking movement, an anti-friction roller mounted in said cradle, said cradle having auxiliary bearing surfaces curved concentrically with said trunnions, and curved bearing surfaces coöperable with said auxiliary bearing surfaces of the cradle.

2. In a side bearing, the combination with a base member having trunnion bearings, of a cradle having trunnions mounted in said bearings and thereby adapting the cradle for rocking movement, an anti-friction roller mounted in said cradle, said cradle having auxiliary bearing surfaces curved concentrically with said trunnions, and curved bearing surfaces coöperable with said auxiliary bearing surfaces of the cradle, said bearing surfaces which coöperate with those of the cradle being formed integrally with the base member.

3. In a side bearing, the combination with a hollow base member, of a cradle having trunnions mounted in bearings provided in the base member, an anti-friction roller supported by the cradle, and a block inserted within the base member at the bottom thereof, said block being provided with upper curved bearing surfaces concentric with the axes of said trunnions, said cradle having depending flanges provided with curved bearing surfaces coöperable with those of said insert block.

4. In a side bearing, the combination with a base member having trunnion bearings, of a hollow box-like cradle having trunnions at its ends seated in said bearings and thereby adapting the cradle to rock, of an anti-friction roller rotatably mounted within said cradle, the end walls of said cradle being extended below the trunnions and provided with curved bearing surfaces concentric with the axes of the trunnions, and coöperating bearing surfaces.

5. As an article of manufacture, a roller carrying cradle for side bearings, said cradle comprising a hollow substantially box-like member having trunnions formed on the outer sides of the end walls thereof, an axle having its ends mounted in the side walls of said cradle, an anti-friction roller rotatably mounted on said axle, the end walls of said cradle being extended and having their edges curved concentrically with the axes of the trunnions to thereby provide auxiliary bearings for the cradle.

6. In a side bearing for railway cars and the like, the combination with a hollow base casting of substantially rectangular formation, said base casting being provided on its interior with cylindrical curved bearing surfaces, of a cradle having side and end walls, the end walls of said cradle being rounded on their bottom faces to coöperate with said cylindrical bearing surfaces of the base casting and thereby adapting the cradle to rock within the base casting; an anti-friction roller supported by the side walls of said cradle; and studs formed on the outer sides of the end walls of said cradle, said base casting having its end walls provided with recesses adapted to accommodate said lugs and permit said rocking movement of the cradle.

In witness that I claim the foregoing I have hereunto subscribed my name this 15th day of June, 1918.

JOHN F. O'CONNOR.